(12) United States Patent
Barnoy

(10) Patent No.: US 8,760,726 B2
(45) Date of Patent: Jun. 24, 2014

(54) HIGH RESOLUTION DIGITAL EMBOSSING

(75) Inventor: Eyal Barnoy, Tel Aviv (IL)

(73) Assignee: Scodix Ltd., Rosh Ha'Ain (IL)

( * ) Notice: Subject to any disclaimer, the term of this patent is extended or adjusted under 35 U.S.C. 154(b) by 0 days.

(21) Appl. No.: 13/696,614

(22) PCT Filed: Jun. 5, 2011

(86) PCT No.: PCT/IL2011/000439
§ 371 (c)(1),
(2), (4) Date: Nov. 28, 2012

(87) PCT Pub. No.: WO2011/154936
PCT Pub. Date: Dec. 15, 2011

(65) Prior Publication Data
US 2013/0070307 A1 Mar. 21, 2013

Related U.S. Application Data

(60) Provisional application No. 61/344,203, filed on Jun. 10, 2010.

(51) Int. Cl.
*H04N 1/40* (2006.01)
(52) U.S. Cl.
USPC ......... 358/3.29; 358/1.9; 358/1.11; 358/1.18; 358/3.31

(58) Field of Classification Search
None
See application file for complete search history.

(56) References Cited

U.S. PATENT DOCUMENTS

| | | | |
|---|---|---|---|
| 6,231,931 B1 * | 5/2001 | Blazey et al. | 427/508 |
| 6,535,712 B2 * | 3/2003 | Richards | 399/341 |
| 6,550,909 B2 * | 4/2003 | Ichinose et al. | 347/105 |
| 6,648,446 B1 * | 11/2003 | Rutland et al. | 347/21 |
| 7,629,400 B2 * | 12/2009 | Hyman | 524/106 |
| 7,703,811 B2 * | 4/2010 | Isherwood | 283/82 |
| 2006/0158494 A1 * | 7/2006 | Yamanobe | 347/96 |
| 2006/0227194 A1 * | 10/2006 | Hoshino | 347/102 |
| 2007/0171444 A1 * | 7/2007 | Washino | 358/1.9 |
| 2008/0211866 A1 * | 9/2008 | Hill | 347/42 |
| 2009/0250920 A1 * | 10/2009 | Isherwood et al. | 283/91 |

* cited by examiner

*Primary Examiner* — Dung Tran

(57) ABSTRACT

A method of high resolution digital embossing by printing a polymer overlayer over a printed file, comprising: receiving a digital image of a printed file, identifying text characters in the digital image, for each identified text characters determining the font type and size, using a lookup table to determine a percentage of polymer pixels reduction for the identified font type and size, creating a raster image for a polymer overlayer to be printed over the printed areas of the printed file and printing a polymer overlayer according to the raster image over the printed file, wherein creating a raster image comprises stochastically removing the determined percentage of pixels from the overlay area concurrent with each identified character.

29 Claims, 9 Drawing Sheets

8p - ABCDEFGHIJKLMNOPQ

10p - ABCDEFGHIJKLN

15p - ABCDEFG

8p - ABCDEFGHIJKLMNOPQ

10p - ABCDEFGHIJKLM

15p - ABCDEFG

Fig. 4

| POLYMER PERCENTAGE REDUCTION LUT ||||| 
|---|---|---|---|---|
| PAPER TYPE | FONT TYPE | FONT SIZE | OUTPUT RESOLUTION | % REDUCTION |
| Derproza | Times New Roman | 6 | 362.85 | 50 |
| Derproza | Times New Roman | 8 | 362.85 | 50 |
| Derproza | Times New Roman | 10 | 362.85 | 25 |
| Derproza | Times New Roman | 12 | 362.85 | 0 |

Fig. 5

HIGH RESOLUTION DIGITAL EMBOSSING

CROSS-REFERENCE TO RELATED PATENT APPLICATIONS

This patent application claims priority from and is related to U.S. Provisional Patent Application Ser. No. 61/344,203, filed 10 Jun. 2010, this U.S. Provisional Patent Application incorporated by reference in its entirety herein.

FIELD OF INVENTION

The present invention is directed to providing raised print using digital printing techniques.

Background

Embossing provides a texture to a media, which is associated with quality. Embossed or raised printing was used for calling cards and invitations to society events. In recent years, digital printing and laser and ink jet technologies have largely displaced traditional printing techniques, and made high quality printing far more affordable. Such printing techniques do, however, lack the textured aspect that is still sometimes considered desirable.

Amongst other products, Scodix™ provides relatively thick printing of photo-polymeric inks which provide a texture to a medium. Where transparent photo-polymeric ink is printed over a pigmented ink, an illusion of raised printing is created. Such photo-polymeric inks may be digitally printed using an ink-jet printer and thus text and image supplied as electronic data can be rendered as a textured surface.

Typically, a relatively thick, typically 100 micron layer of polymer is digitally printed, typically using ink jet technology, on top of the text or graphic that is printed in ink.

One disadvantage of the technique is that the illusion is lost when printing fine details and small point size text, since the thick polymer layer printed over the fine detail pigmented ink layer splurges therearound and is clearly an overlay and not the result of embossing. Furthermore, sometimes the thick polymer overlayer, which sometimes assumes a bubble like shape, may act as a magnifier to the under-laying print and the resolution thereof is effectively degraded thereby. There is thus a need to print fine detail such as small point text in ink with a raised polymer overlay thereover, such that the illusion of embossing is achieved, with crisp lines of overlay printed with similar resolution to the underlying pigmented print. The present invention addresses this need.

SUMMARY OF THE INVENTION

According to a first aspect of the present invention there is provided a method of high resolution digital embossing by printing a polymer overlayer over a printed file, comprising the steps of: a. receiving a digital image of a printed file; b. identifying text characters in said digital image; c. for each said identified text characters, determining the font type and size of said character; d. using a lookup table to determine a percentage of polymer pixels reduction for said identified font type and size; e. creating a raster image for a polymer overlayer to be printed over the printed areas of said printed file; and
f. printing a polymer overlayer according to said raster image over said printed file, wherein said creating a raster image comprises stochastically removing said determined percentage of pixels from the overlay area concurrent with each said identified characters.

The method may additionally comprise after step (d), the steps of:
d1. identifying thin lines in said digital image; d2. for each said identified thin lines, determining the line width; and d3. using a lookup table to determine a percentage of polymer pixels reduction for said identified line width, wherein said creating a image file additionally comprises stochastically removing said determined percentage of pixels from the overlay area concurrent with each said identified thin lines.

The digital image may be a PDF file and identifying text characters and determining the font type and size of said characters and said line widths may comprise extracting objects from said PDF file dictionary.

The lookup table may additionally comprise at least one of: paper type and output resolution.

According to a second aspect of the present invention there is provided a method of high resolution digital embossing by printing a polymer overlayer over a printed file, comprising the steps of: a. receiving a digital image of a printed file; b. identifying a text character in said digital image; c. determining the font type and size of said character; d. using a lookup table to determine a percentage of polymer pixels reduction for said identified font type and size;
e. creating a raster image for a polymer overlayer to be printed over the printed area of said character; f. repeating steps (b) through (e); and
g. printing a polymer overlayer according to said raster image over said printed file, wherein said creating a raster image comprises stochastically removing said determined percentage of pixels from the overlay area concurrent with said identified character.

The method may additionally comprise after step (e), the steps of:
d1. identifying a thin line in said digital image; d2. determining said line width; d3. using a lookup table to determine a percentage of polymer pixels reduction for said identified line width; and d4. creating a raster image for a polymer overlayer to be printed over the printed area of said line, wherein said creating a image file additionally comprises stochastically removing said determined percentage of pixels from the overlay area concurrent with each said identified thin lines.

According to a third aspect of the present invention there is provided a system for high resolution digital embossing by printing a polymer overlayer over a printed file, comprising: a digital printer; a controller communicating with said digital printer; and a workstation communicating with said controller, said workstation comprising: a first storage unit for storing digital images of printed files; an image processing module adapted to analyse files from said first storage unit, said image processing unit comprising means for identifying text characters in said analysed files; a polymer percentage calculation module comprising a lookup table adapted to determine a percentage of polymer pixels reduction for identified text characters; a raster image processor communicating with said first storage unit, said image processing module and said polymer percentage calculation module, said raster image processor adapted to create a raster image for a polymer overlayer to be printed over the printed areas of said printed file, said raster image comprising stochastically removed pixels from the overlay area concurrent with each said identified characters, according to said determined percentage.

The image processing module may additionally comprise means for identifying thin lines in said analysed files, and said lookup table may additionally be adapted to determine a percentage of polymer pixels reduction for identified thin lines and said raster image may additionally comprise stochastically removed pixels from the overlay area concurrent with each said identified thin lines, according to said determined percentage.

The system may comprise a second storage unit communicating with said raster image processor, for storing raster overlay images.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1 shows a regularly printed alphabet in a (san serif) font;

FIG. 4 is a faded out version of a san serif font formed stochastically not printing a proportion of the pixels, such that when the polymer layer is printed in this manner over an underlying printed font, the illusion of crisp clear embossed print is restored;

FIG. 5 is a partial exemplary lookup table according to the present invention;

DETAILED DESCRIPTION OF THE EMBODIMENTS

In the following description, some embodiments of the present invention will be described as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

The computer program for performing the method of the present invention may be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of a local or remote network or other communication medium. Those skilled in the art will readily recognize that the equivalent of such a computer program product may also be constructed in hardware or firmware known as application specific integrated circuits (ASICs).

An ASIC may be designed on a single silicon chip to perform the method of the present invention. The ASIC can include the circuits to perform the logic, microprocessors, and memory necessary to perform the method of the present invention. Multiple ASICs may be envisioned and employed as well for the present invention.

With reference to FIG. 1, a sample of crisply printed text is shown. Ink jet technology of 750 dpi or more is now common place and text as fine as 8 point is easily printed. Similarly, graphics having a line thickness of microns is commonplace.

Figure 2:
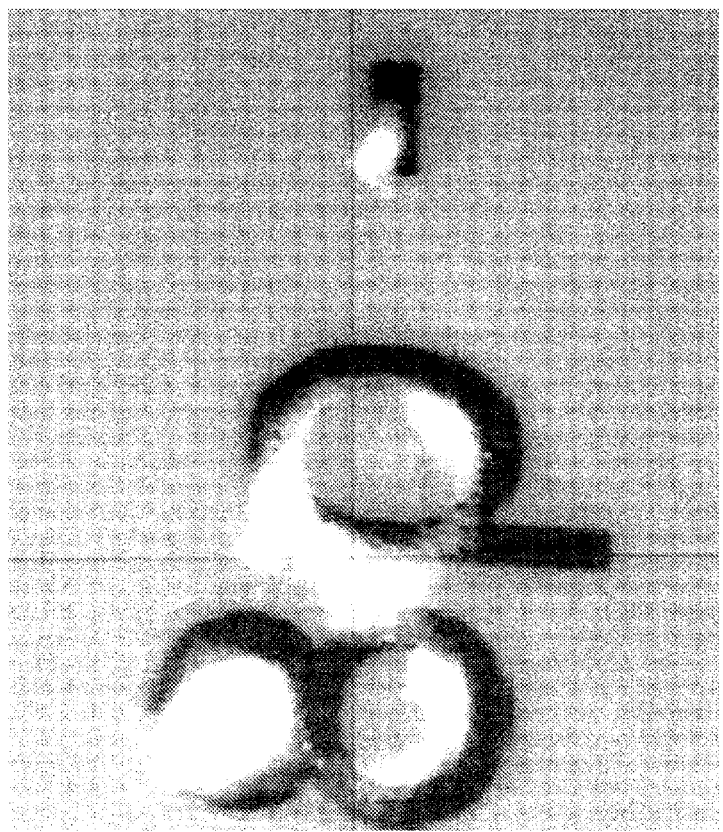
FIG. 2 is a screen capture showing the number 8 and the letter P in 8 point print after overprinting with polymer, showing how, when printing a font using a small point size, the overlying polymer layer splurges beyond the underlying ink and destroys the illusion of embossing, the quality of the printing is degraded and sometimes the polymer effectively magnifies the small point text therebelow.

A method of giving the illusion of embossing may be achieved by printing a thick layer (typically 100 micron thick layer) of a photo-polymeric ink on top of ink printed text or graphics. The technique has, however, been found unsatisfactory for overprinting thin lines such as encountered in small point printing. Essentially, as shown in the screen capture of FIG. 2, showing the number 8 and the letter P in 8-point print after overprinting with polymer, when printing a font using a small point size, such as 8-point print, the overlying polymer layer splurges beyond the underlying ink and destroys the illusion of embossing, the quality of the printing is degraded and sometimes the polymer effectively magnifies the small point text therebelow. Thus, printing a 100 micron layer of polymer on top of fine detail is unsatisfactory. An 8 and a P are shown in 8 point print. Due to the polymer overlay splurging beyond the underlying pigmented ink layer, the illusion of embossing is lost. Furthermore, the distorting caused to incident light due to the lens effect of the convex meniscus of the over-layer is such that fine printing may look smudged since prior to the UV curing, the polymer spreads out somewhat as the surface tension causes it to adopt a curved profile.

Figure 3:
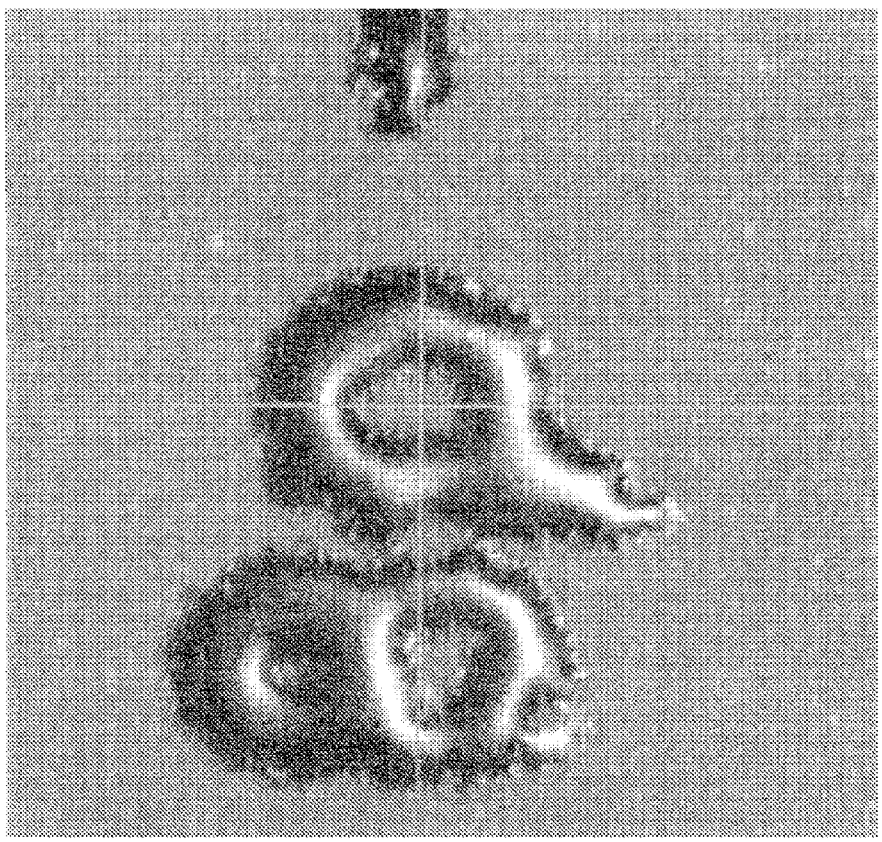
FIG. 3 is a screen capture of a better overprinting where the effects shown in FIG. 2 are avoided by reducing the amount of polymer in the overprinted layer.

FIG. 3 is a screen capture of a better overprinting where the effects shown in FIG. 2 are avoided by reducing the amount of polymer in the overprinted layer.

FIG. 4 is a faded out version of a san serif font formed stochastically not printing a proportion of the pixels, such that when the polymer layer is printed in this manner over an underlying printed font, the illusion of crisp clear embossed print is restored;

It has surprisingly been found possible to overcome this limitation of ink with polymer overprinting by using a stochastic algorithm to randomly not print a proportion of the pixels in the corresponding pixels of polymer over the fine resolution (low point) characters and lines. The viscous polymer ink flows to fill up the missing pixels, both limiting the spread of the polymer beyond the boundaries of the characters and lines and reducing the height of the polymer coating. It is this reduced height coating which conforms closely to the underlayer of regular pigmented ink, maintaining the illusion of embossing.

Essentially, a software algorithm analyses the image to be printed and identifies small point fonts and thin lines. Depending on the point size and the font, or on the line width, the stochastic algorithm is applied proportionally, so that the smaller the font size or line width, the larger the percentage of pixels of polymer that are not printed. Due to the surface tension of the polymer, printing only part of the pixels tends to create a thinner continuous layer of polymer which better conforms to the shape and size of the underlying printed text or line, such that when it is cured, typically by exposure to ultraviolet illumination, the polymer over-layer follows the pigmented underlayer and the resultant letters and lines look embossed.

In this manner, after curing, typically by exposure to UV light, the layer of polymer over the low point text is lower—as would be the case with proper raised printing.

It will be appreciated that the percentage of pixels that can be missed is a function of the font type and size.

By way of example, for 14 point Times Roman, the polymer can be printed over the characters as an exact match. For 12 point Times Roman, only 85% of polymer pixels should be printed thereover. For 10 point print, the coverage should be 60%-70% and for 8 point print, perhaps 45%.

As will be appreciated by persons skilled in the art, the exact percentage coverage is dependent on the ink absorbance properties of the medium to be printed, on and the viscosity and other properties of the polymer ink and, to some extent, on ambient conditions such as the temperature and humidity of the environment. Since this technique, will, by its nature, be used for invitations, certificates and the like, it will typically be used on expensive typically textured cardstock, possibly with recycled fibers, and often for italic fonts. Consequently, no accurate recipes are provided, but following the guidelines provided hereinabove, minimal trial and error is required to optimise the printing for each scenario.

Essentially therefore, the image to be printed, typically a graphics file such as a PDF, is analyzed to identify fine detail, either by character recognition or by line dimensions. Depending on the font size, line width, etc. a percentage of the pixels selected stochastically are not printed. The percentage goes up with decreasing point size and can be determined using a look-up table (LUT) or a self learning algorithm that appreciates the viscosity of the ink and of the polymer over printing ink, and that is sensitive to the ink fastness and absorbency of the medium to be printed.

The system according to the present invention may provide the user with a factory created LUT comprising various combinations of paper type, font style, font size, output file resolution, and the appropriate percentage of polymer to be reduced.

FIG. 5 shows a partial exemplary LUT.

A calibration process may also be provided with the system, to enable the user to perform trial prints with his appropriate parameters and add results to the supplied LUT.

It will be appreciated that the idea of improving clarity and resolution of small characters (and optionally fine lines) by intentionally not overprinting some of the pixels they comprise is a counter-intuitive approach.

If the original page to be overprinted is a PDF file, the system may use the information embedded in the PDF file, such as a dictionary containing information about all the objects in the file, to identify text objects' font type and size and line widths.

Alternatively, if the original page to be overprinted is an image file, such as for example GIF, JPEG or BITMAP, an image processing algorithm may be applied to the image file to identify text characters and determine their sizes. For example, any OCR algorithm known in the art may be applied to the image file.

The information regarding the identified small characters and/or thin lines is then transferred to the polymer percentage reduction algorithm, along with the original file, to perform a stochastic reduction of the polymer over the detected areas.

The resulting digital file describing the polymer overlayer is then subject to rasterzation and the raster file is sent to the printer to be printed over the original printed page, followed by a curing process, such as UV or IR curing, depending on the polymer properties. Alternatively or additionally, the raster file may be stored in overprint files storage 170.

Figure 6:
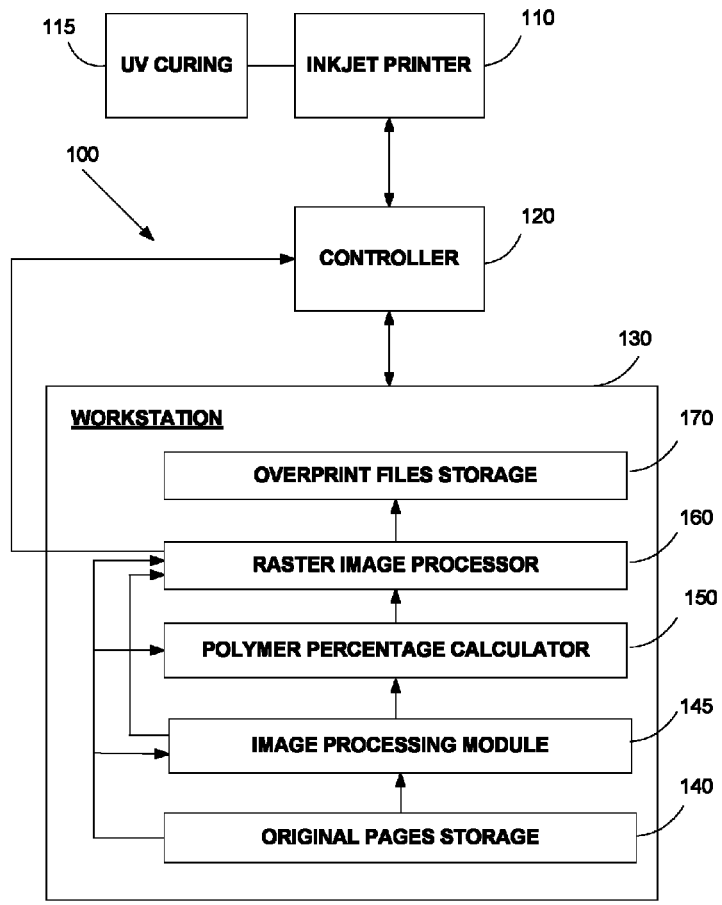
FIG. 6 is a schematic drawing showing the system components for carrying out the method according to an embodiment of the invention.

FIG. 6 is a schematic drawing showing the system components for carrying out the method according to the invention. The system 100 comprises an inkjet printer 110, adapted to print overlay polymers, an electronic controller 120, communicating bi-directionally with the printer 110, and a workstation 130, comprising a storage 140 of digital pages representing the printed pages onto which the overlay is to be printed, an image processing module 145 for analyzing the input file as described above, a polymer percentage calculating software module 150, for receiving a digital page image from storage 130 and the identification of small characters and/or thin lines from the image processing module 145 and determining the percentage of overlay printing on various areas of the page, a raster image processor (RIP) 160, adapted to create a raster image file representing the overlay to be printed, taking into consideration the output of the polymer percentage calculator, and an overprint files storage 170, storing rasterized overlay files to be printed. The system 100 may additionally comprise a curing station 115, preferably connected with the digital printer 110.

It will be appreciated that while the controller 120 and the workstation 130 have been shown as two separate entities, their functions may also be performed by a single unit (controller) without departing from the spirit of the invention.

Figure 7:
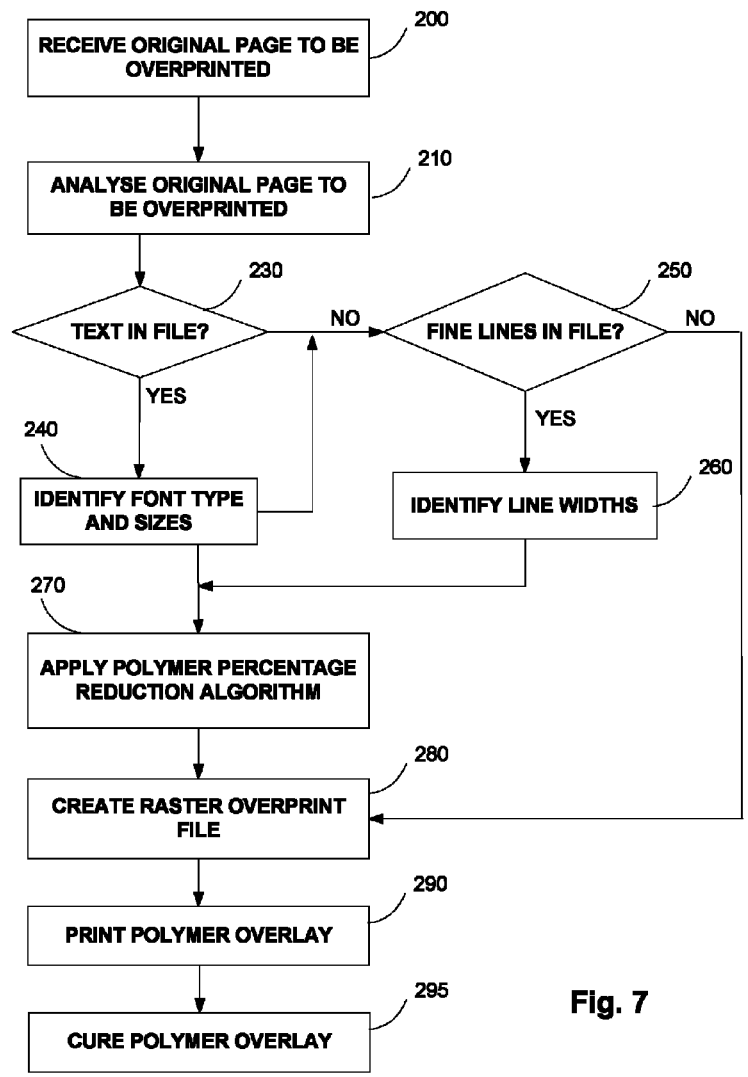
FIG. 7 is a flowchart showing the various steps for performing the method according to an embodiment of the invention.

FIG. 7 is a flowchart showing the various steps for performing the method according to the invention.

In step 200, the image processing module 145 receives a digital image file representing a printed page onto which a polymer overlay is to be printed.

In step 210, the image processing module 145 analyses the file. If the file is determined in step 230 to be contain text, the font size is identified in step 240 and the program proceeds to step 250. If the file is determined to contain thin lines in step 250, the line widths are identified in step 260.

In step 270, the polymer reduction algorithm is applied to the original image file, to determine the percentage of polymer to be reduced from the identified image areas.

In step 280 the RIP module receives the original image file and the results of the polymer reduction algorithm and creates a rasterized overlay file, implementing stochastically the results of the polymer percentage calculating software module 150, i.e. randomly selecting the pixels to be printed in the predefined reduced areas.

In step 290 the raster file is sent to the printer, via the controller 120, to be printed. Alternatively or additionally, the raster file me be stored in overprint files storage 170.

In step 295 the printed overlayer is cured, preferably using UV curing means.

Figure 8:
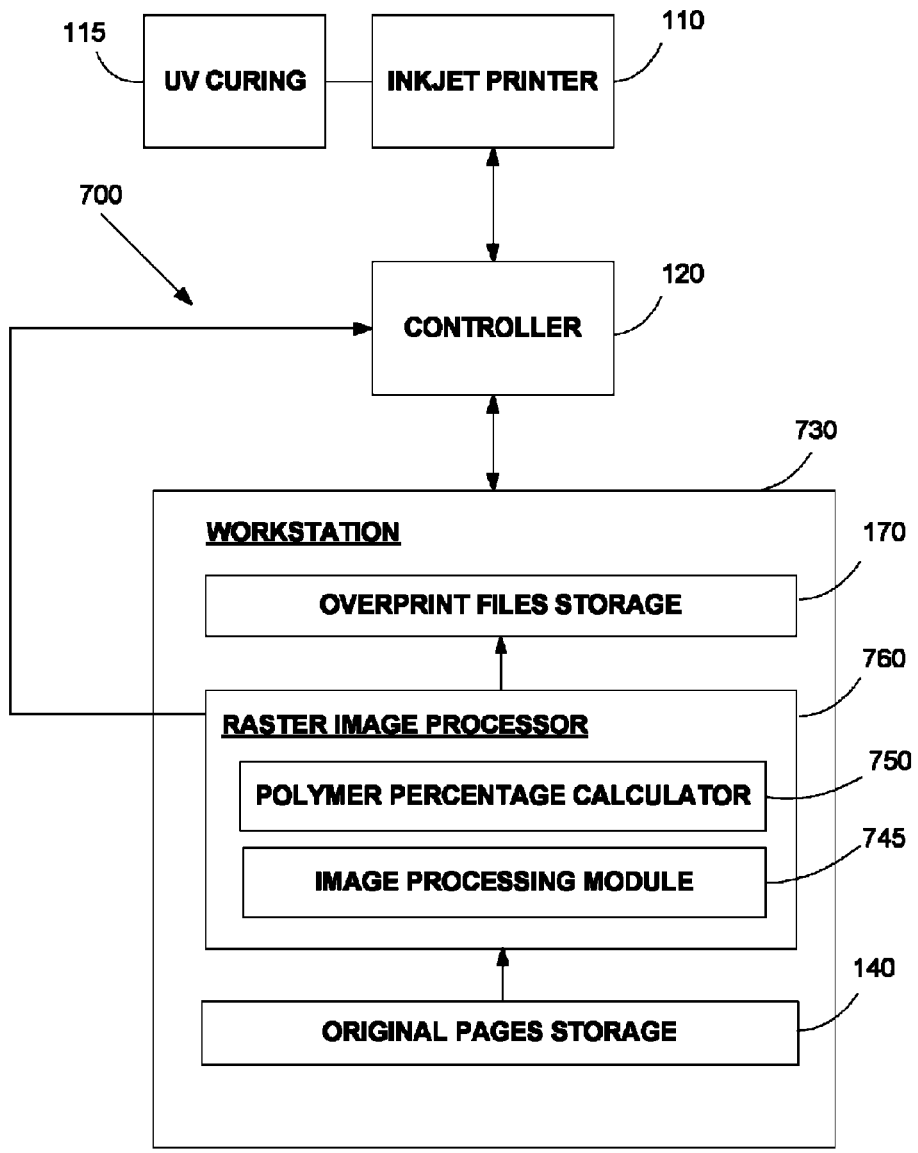
FIG. 8 is a schematic drawing showing the system components for carrying out the method according to a preferred embodiment of the invention.

It will be appreciated that the modules described above in conjunction with FIG. 6 may be implemented in other ways to achieve the same functionality. For example, as depicted in the preferred embodiment of FIG. 8, in workstation 730 of system 700 the RIP module 760 incorporates the functionalities of the image processing module 745 and of the polymer percentage calculator 750. According to this embodiment, the RIP 760 performs the operations of image processing, percentage calculation and rasterization including stochastic reduction of pixels on-the-fly.

Figure 9:
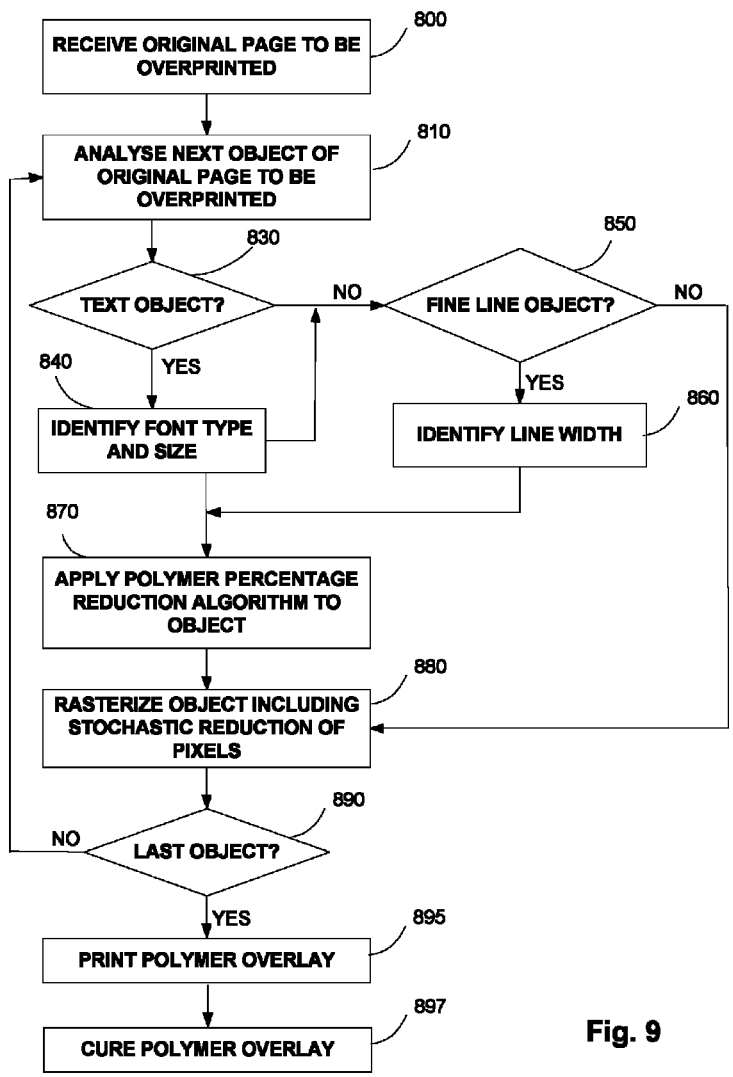
FIG. 9 is a flowchart showing the various steps for performing the method according to a preferred embodiment of the invention.

FIG. 9 is a flowchart showing the various steps for performing the method according to the second preferred embodiment.

In step 800, the RIP 760 receives a digital image file representing a printed page onto which a polymer overlay is to be printed.

In step 810, the image processing module 145 within the RIP 760 analyses the file by sequentially going through its objects. If an object is determined in step 830 to be text, the font size is identified in step 840 and the program proceeds to step 870. If the object is determined to be a thin line step 850, the line width are identified in step 860.

In step 880, the overlayer portion of the object is rasterized, including stochastic reduction of pixels as determined in step 870, i.e. randomly selecting the remaining pixels to be printed over the object.

When all the objects have been processed (step 890), the raster file is sent to the printer (step 895), via the controller 120, to be printed. Alternatively or additionally, the raster file me be stored in overprint files storage 170.

In step 897 the printed overlayer is cured, preferably using UV curing means.

The polymer reduction algorithm described above may be operated automatically, for each digital embossing overprinting task, or according to user selection.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A method of high resolution digital embossing by printing a polymer overlayer over a printed file, comprising the steps of:
   a. receiving a digital image of a printed file;
   b. identifying text characters in said digital image;
   c. for each said identified text characters, determining the font type and size of said character;
   d. using a lookup table to determine a percentage of polymer pixels reduction for said identified font type and size;
   e. creating a raster image for a polymer overlayer to be printed over the printed areas of said printed file; and
   f. printing a polymer overlayer according to said raster image over said printed file,
   wherein said creating a raster image comprises stochastically removing said determined percentage of pixels from the overlay area concurrent with each said identified characters.

2. The method of claim 1, additionally comprising after step (d), the steps of:
   d1. identifying thin lines in said digital image;
   d2. for each said identified thin lines, determining the line width; and
   d3. using a lookup table to determine a percentage of polymer pixels reduction for said identified line width, wherein said creating a raster image file additionally comprises stochastically removing said determined percentage of pixels from the overlay area concurrent with each said identified thin lines.

3. The method of claim 1, additionally comprising the step of curing said printed polymer overlayer.

4. The method of claim 3, wherein said curing comprises UV curing.

5. The method of claim 2, additionally comprising the step of curing said printed polymer overlayer.

6. The method of claim 5, wherein said curing comprises UV curing.

7. The method of claim 1, wherein said digital image is a PDF file and wherein identifying text characters and determining the font type and size of said characters comprises extracting objects from said PDF file dictionary.

8. The method of claim 2, wherein said digital image is a PDF file and wherein identifying thin lines and determining the line widths comprises extracting objects from said PDF file dictionary.

9. The method of claim 1, wherein said lookup table additionally comprises at least one of: paper type and output resolution.

10. The method of claim 2, wherein said lookup table additionally comprises at least one of: paper type and output resolution.

11. A method of high resolution digital embossing by printing a polymer overlayer over a printed file, comprising the steps of:
    a. receiving a digital image of a printed file;
    b. identifying a text character in said digital image;
    c. determining the font type and size of said character;
    d. using a lookup table to determine a percentage of polymer pixels reduction for said identified font type and size;
    e. creating a raster image for a polymer overlayer to be printed over the printed area of said character;
    f. repeating steps (b) through (e); and
    g. printing a polymer overlayer according to said raster image over said printed file,
    wherein said creating a raster image comprises stochastically removing said determined percentage of pixels from the overlay area concurrent with said identified character.

12. The method of claim 11, additionally comprising after step (e), the steps of:
    d1. identifying a thin line in said digital image;
    d2. determining said line width;
    d3. using a lookup table to determine a percentage of polymer pixels reduction for said identified line width; and
    d4. creating a raster image for a polymer overlayer to be printed over the printed area of said line,
    wherein said creating a raster image file additionally comprises stochastically removing said determined percentage of pixels from the overlay area concurrent with each said identified thin lines.

13. The method of claim 11, additionally comprising the step of curing said printed polymer overlayer.

14. The method of claim 13, wherein said curing comprises UV curing.

15. The method of claim 12, additionally comprising the step of curing said printed polymer overlayer.

16. The method of claim 15, wherein said curing comprises UV curing.

17. The method of claim 11, wherein said digital image is a PDF file and wherein identifying text characters and determining the font type and size of said characters comprises extracting objects from said PDF file dictionary.

18. The method of claim 12, wherein said digital image is a PDF file and wherein identifying thin lines and determining the line widths comprises extracting objects from said PDF file dictionary.

19. The method of claim 11, wherein said lookup table additionally comprises at least one of: paper type and output resolution.

20. The method of claim 12, wherein said lookup table additionally comprises at least one of: paper type and output resolution.

21. A system for high resolution digital embossing by printing a polymer overlayer over a printed file, comprising:
   a digital printer;
   a controller communicating with said digital printer; and
   a workstation communicating with said controller, said workstation comprising:
   a first storage unit for storing digital images of printed files;
   an image processing module adapted to analyse files from said first storage unit, said image processing unit comprising means for identifying text characters in said analysed files;
   a polymer percentage calculation module comprising a lookup table adapted to determine a percentage of polymer pixels reduction for identified text characters;
   a raster image processor communicating with said first storage unit, said image processing module and said polymer percentage calculation module, said raster image processor adapted to create a raster image for a polymer overlayer to be printed over the printed areas of said printed file,
   said raster image comprising stochastically removed pixels from the overlay area concurrent with each said identified characters, according to said determined percentage.

22. The system of claim 21, wherein said image processing module additionally comprises means for identifying thin lines in said analysed files, said lookup table is additionally adapted to determine a percentage of polymer pixels reduction for identified thin lines and said raster image additionally comprising stochastically removed pixels from the overlay area concurrent with each said identified thin lines, according to said determined percentage.

23. The system of claim 21, additionally comprising a second storage unit communicating with said raster image processor, for storing raster overlay images.

24. The system of claim 22, additionally comprising a second storage unit communicating with said raster image processor, for storing raster overlay images.

25. The system of claim 22, additionally comprising a second storage unit communicating with said raster image processor, for storing raster overlay images.

26. The system of claim 21, additionally comprising curing means.

27. The system of claim 26, wherein said curing means comprise UV curing means.

28. The system of claim 22, additionally comprising curing means.

29. The system of claim 28, wherein said curing means comprise UV curing means.

* * * * *